US007275025B2

(12) United States Patent
Chan et al.

(10) Patent No.: US 7,275,025 B2
(45) Date of Patent: Sep. 25, 2007

(54) METHOD AND SYSTEM FOR ANALYZING PERFORMANCE OF A TURBINE

(75) Inventors: Jeffrey Chan, Marietta, GA (US); John Karl Reinker, Marietta, GA (US); Suresh Sharma, Marietta, GA (US)

(73) Assignee: General Electric Company, Schenectady, NY (US)

( * ) Notice: Subject to any disclaimer, the term of this patent is extended or adjusted under 35 U.S.C. 154(b) by 759 days.

(21) Appl. No.: 09/749,303

(22) Filed: Dec. 27, 2000

(65) Prior Publication Data
US 2002/0123870 A1 Sep. 5, 2002

(51) Int. Cl.
G06G 7/48 (2006.01)
G06G 17/50 (2006.01)
G06F 19/00 (2006.01)
F16D 33/00 (2006.01)

(52) U.S. Cl. .................. 703/7; 703/1; 703/6; 703/8; 703/12; 700/98; 700/103; 60/340

(58) Field of Classification Search .................. 703/7, 703/8; 60/39.34, 39.37; 700/287
See application file for complete search history.

(56) References Cited

U.S. PATENT DOCUMENTS

| 3,911,286 | A | * | 10/1975 | Uram ............... 290/40 R |
| 4,189,939 | A | * | 2/1980 | West et al. ............ 73/116 |
| 4,297,848 | A | * | 11/1981 | Silvestri, Jr. ............ 60/660 |
| 5,347,466 | A | * | 9/1994 | Nichols et al. ............ 703/18 |
| 5,666,297 | A | * | 9/1997 | Britt et al. ............ 703/18 |
| 5,886,895 | A | * | 3/1999 | Kita et al. ............ 700/28 |
| 6,041,263 | A | * | 3/2000 | Boston et al. ............ 700/32 |
| 6,230,495 | B1 | * | 5/2001 | Benesch et al. ............ 60/660 |
| 6,292,763 | B1 | * | 9/2001 | Dunbar et al. ............ 703/7 |
| 6,314,422 | B1 | * | 11/2001 | Barker et al. ............ 707/10 |

OTHER PUBLICATIONS

Reed-J.A. et al. "Developing Interactive Education Engi neering Software for the World Wide Web with Java". 1998 vol. 30, No. 3-4, p. 183-194. Dept. of Mech, Ind & Manuf Eng. Toledo Univ, OH USA.*
Reed-J.A. et al. "Improving the Aircraft Design Process Using Web-Based Modeling and Simulation" ACM 2000 p. 58-83.*

(Continued)

Primary Examiner—Anthony Knight
Assistant Examiner—Tom Stevens
(74) Attorney, Agent, or Firm—Nixon & Vanderhye, PC

(57) ABSTRACT

A method and system for analyzing performance of a turbine. The turbine optimizer allows a user to evaluate the current performance of their turbine with its current configuration and the future performance of their turbine with a modified configuration. The turbine optimizer determines the current performance characteristic of the turbine based on the current configuration information. Upon receiving from a user a request to display the future performance characteristics, the turbine optimizer calculates the performance characteristics for that turbine if various modifications are made to its configuration. The turbine optimizer may provide a graph that illustrates the current performance characteristics and future performance characteristics with those modifications. The turbine optimizer may also calculate various financial estimates based on the current operating characteristics or future operating characteristics of the turbine.

37 Claims, 13 Drawing Sheets

OTHER PUBLICATIONS

Tzvetan-D. et al. "Network Agents for Scientific Computing" ACM 1999. p. 48-54.*

Reingold-J et al. "Why the Productivity Revolution Will Spread, The Net's Revamping of Old-Line Industry May Save Trillions," BusinessWeek Online: Feb. 14, 2000. http://www.businessweek.com/2000 p. 1-6.*

GE 1999 Annual Report, Power Systems. http://www.ge.com/annual99/business. p. 1-8.*

Gillespie-N. "Finishing Stroke—How Jack Welch Set Up GE for "e". . . and how GE's oldest business . . . Lighting, is applying it". Aug. 2000 p. 1-8 (pertinent page: p. 1).*

Gillespie-N "Finishing Stroke" The Electrical Distributor Maganize Aug. 2000 p. 1-7.*

Torres et al., "Experimental Investigation of Combustion Instabilities in a Gas Turbine Combustor Simulator" AIAA. 1999. p. 1-10.*

Afjeh et al., "Development of an Intelligent Monitoring and Control System for a Heterogeneous Numerical Propulsion System Simulation" IEEE 1995 p. 278-287.*

Chang et al., "Developmnet of a Wind Turbine Simulator for Wind Energy Conversion Systems" IEEE 2000 p. 550-554.*

Reed et al., "Development Interactive Education Engineering Software for the World Wide Web" ACM. 1998 p. 1-11.*

Juniper-L., "Pilot-Scale Evaluation of Australian Thermal Coal for Combustion and Gasification" The Australian Coal Review, 1998. p. 42-48.*

Amaris et al., Frequency Domain Analysis of Flicker Producted by Wind Energy Conversions Systems 1998 IEEE p. 1162-1167.*

Reingold, Jennifer and Stepanek, Marcia, "Why the Productivity Revolution Will Spread, The Net's Revamping of Old-Line Industry May Save Trillions, " Businessweek Online: Feb. 14, 2000 Issue http://www.businessweek.com:/2000 [Accessed Feb. 14, 2002].

GE 1999 Annual Report, Power Systems http://www.ge.com/annual99/business [Accessed Feb. 14, 2002].

* cited by examiner

Fig. 1

Uprate Performance Impact Matrix

| | Customer Name | SN | | Current Rating | Stg1 | S1B, S1S | S1N, S1S | S1B, S1N | 88 IGV | CDC/ HPP | S2B, S2S | S3B, S3S | S2B, S2S, S3B, S3S | Stg2 Stg3 | Performance Impact (parts only) |
|---|---|---|---|---|---|---|---|---|---|---|---|---|---|---|---|
| | ACME | 297031 | Output | 163272 | 0.64 | 0.31 | 0.70 | 0.13 | 0.00 | 0.00 | 0.08 | -0.03 | 0.09 | 0.59 | 1.30 |
| | Tf=2420, IGV=90 | | HR | 9623 | -0.51 | 0.02 | -0.55 | 0.36 | 0.00 | 0.00 | 0.02 | 0.07 | 0.03 | -0.20 | -0.77 |
| | Smith | 297112 | Output | 165151 | 0.54 | 0.21 | 0.70 | 0.03 | 0.00 | 0.00 | 0.08 | -0.03 | 0.09 | 0.59 | 1.20 |
| | Tf=2420 | | HR | 9461 | -0.51 | 0.02 | -0.55 | 0.36 | 0.00 | 0.00 | 0.02 | 0.07 | 0.03 | -0.20 | -0.77 |

| TT | Sum Parts+ TT | Cycle Deck Run | FV1B | FV1P | FV1T | FV1U | FV1V | FV1W | FV1N | FV1O | FV1Q | FV4B | FV4P | FV4T | FV4U | FV4V |
|---|---|---|---|---|---|---|---|---|---|---|---|---|---|---|---|---|
| 0 | 1.3 | | 1.3 | 0.313 | 0.594 | 0.086 | 0.0799 | -0.033 | 0.639 | 0.6993 | 0.125 | n/a | n/a | n/a | n/a | n/a |
| 0 | -0.77 | | -0.77 | 0.02 | -0.198 | 0.026 | 0.02 | 0.0733 | -0.506 | -0.553 | 0.363 | n/a | n/a | n/a | n/a | n/a |
| 0 | 1.3 | | 1.2 | 0.313 | 0.594 | 0.086 | 0.0799 | -0.033 | 0.639 | 0.6993 | 0.125 | n/a | n/a | n/a | n/a | n/a |
| 0 | -0.77 | | -0.77 | 0.02 | -0.198 | 0.026 | 0.02 | 0.0733 | -0.506 | -0.553 | 0.363 | n/a | n/a | n/a | n/a | n/a |

*Fig. 3*

METHOD AND SYSTEM FOR ANALYZING PERFORMANCE OF A TURBINE

CROSS-REFERENCE TO RELATED APPLICATIONS

This application is related to U.S. patent application Ser. No. 09/594,452, entitled "METHOD AND SYSTEM FOR OUTAGE OPTIMIZATION PLANNING," filed on Jun. 15, 2000, the disclosures of which are incorporated herein by reference.

TECHNICAL FIELD

The present disclosure relates generally to analyzing a performance characteristic of a turbine and, more particularly, to a computer system for analyzing performance characteristics based on changes to configuration of the turbine.

BACKGROUND

Turbines that are used in electric or other power plants can be very expensive. Because of this expense, it is desirable to operate such turbines to optimize their performance. The performance can be optimized by selecting an appropriate configuration for the turbine based, for example, on knowledge of the financial information relating to the operation of the turbine. The financial information may include the cost of fuel, tax rate, and annual hours that the turbine is in operation. When the turbine is first installed at a power plant, the configuration can be tailored (e.g., selecting certain options for the turbine) to optimize performance (e.g., maximize the profit) at that time. Various conditions, however, can occur during the life of the turbine that may result in the turbine performing less than optimally. For example, the performance of the turbine may degrade over time as a result of normal wear. As the performance degrades, the assumptions that initially resulted in the turbine operating optimally may no longer be valid. As another example, enhanced configuration options may become available from time to time. The adding of an enhanced configuration option to the turbine could result in even better performance. Thus, a turbine that was performing optimally is now no longer performing optimally as a result of the configuration options that are now available. As another example, the cost of fuel may change over time in a way that may mean that certain configuration options would now result in more optimal performance.

Unfortunately, it has been traditionally very difficult for the operators of the power plants to evaluate the performance of a turbine. The operator may elicit the help of the manufacturers of the turbine to determine whether the performance of the turbine can be improved. When the manufacturer receives a request from an operator for a performance evaluation, a representative of the manufacturer would need to first collect the configuration information for the turbine and information on the various enhancement options that are available for that turbine. Once this information has been collected, the representative could calculate the resulting performance characteristics of various enhancement options. For example, the representative may calculate that a certain option would result in a four percent increase in the generated output. The output (e.g., in kilowatts) of the turbine is one performance characteristic. The representative would then notify the operator of the results. The operator could then perform financial calculations to determine which option, if any, can be used to improve the overall performance of the turbine. The accuracy of the performance calculation, of course, depends, in part, on the accuracy of the configuration information that is available to the manufacturer. Often times, the configuration information available to a manufacturer may be outdated. The operator may have changed the configuration of the turbine (e.g., by purchasing an option from a third party) without informing the manufacturer. As a result, it is both difficult and time-consuming for the operator to accurately assess how to configure a turbine to optimize performance.

It would be desirable to have a system in which an operator could accurately identify the configuration for a turbine that would tend to optimize its performance.

One embodiment of the present invention uses the Internet to communicate between plant operators and manufacturers. The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., web server or web site) to send web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it may send a static web page or may prepare and send a dynamically generated web page to the client computer system. When the client computer system receives that web page, it typically displays the web page using a browser. A browser is a special-purpose application program that effects the requesting of web pages and the displaying of web pages.

Currently, web pages are typically defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The World Wide Web is especially conducive to conducting electronic commerce. Many web servers have been developed through which vendors can advertise and sell product. The World Wide Web is increasingly being used to conduct business-to-business (B2B) electronic commerce. For example, businesses are providing web sites through which other businesses can order products and services, obtain product information, communicate, and so on. B2B electronic commerce has the potential of greatly increasing the efficiency of B2B commerce. For example, businesses may be able to substantially reduce their sales force and provide more timely product information to their customers via the World Wide Web.

BRIEF SUMMARY

A method and system for analyzing performance of a turbine is provided. In one embodiment, the turbine optimizer system allows a user to evaluate the current performance of their turbine with its current configuration and the future performance of their turbine with a modified configuration. The evaluated performance may be expressed in terms of certain performance characteristics such as output, heat rate, availability, and reliability. The turbine optimizer may provide a comparison of these performance characteristics versus the performance characteristics of similar turbines. For example, the turbine optimizer may the average performance of similar turbines and the best performance of similar turbines. The turbine optimizer initially receives from the user the identification of the turbine to be analyzed. The turbine optimizer then retrieves the configuration information for the identified turbine from its configuration database. The configuration database may contain information describing the configuration of each turbine that is currently installed at a customer power plant. The turbine optimizer then determines the current performance characteristics of the identified turbine based on the retrieved configuration information. As discussed below more detail, the turbine optimizer may determine the current performance characteristics based on actual measurements of those performance characteristics (e.g., during a precision test), based on initial performance characteristics of a new turbine adjusted to account for hours of operation of the turbine, and based on a simulation of the performance characteristics using measurements of other characteristics (e.g., instrumentation readings). The turbine optimizer then provides to the user a display page that lists the actual or estimated current performance characteristics. That display page may also include current configuration information (e.g., total hours of operation) so that the user can make any appropriate corrections to the information. Upon receiving from the user a request to display the future performance characteristics, the turbine optimizer calculates the performance characteristics for that turbine if various modifications are made to its configuration. The turbine optimizer may provide a graph that illustrates the current performance characteristics and the future performance characteristics with those modifications. The turbine optimizer may also calculate various financial estimates (e.g., the estimated annual revenue) based on the current operating characteristics (e.g., fuel cost and electricity price) of the turbine. The turbine optimizer may also allow the user to place an order to change the configuration of the turbine. In this way, the user can evaluate the performance of turbine based on accurate configuration information, can receive prompt feedback as to the performance characteristics of various modifications, can evaluate financial impact of various modifications, and can compare the performance characteristics of the turbine to performance characteristics of similar turbines.

BRIEF DESCRIPTION OF THE DRAWINGS

FIG. 1 illustrates the display of a unit profile display page in one embodiment.

FIG. 3 is a block diagram illustrating the uprate performance impact matrix and one embodiment.

DETAILED DESCRIPTION

Figure 1:
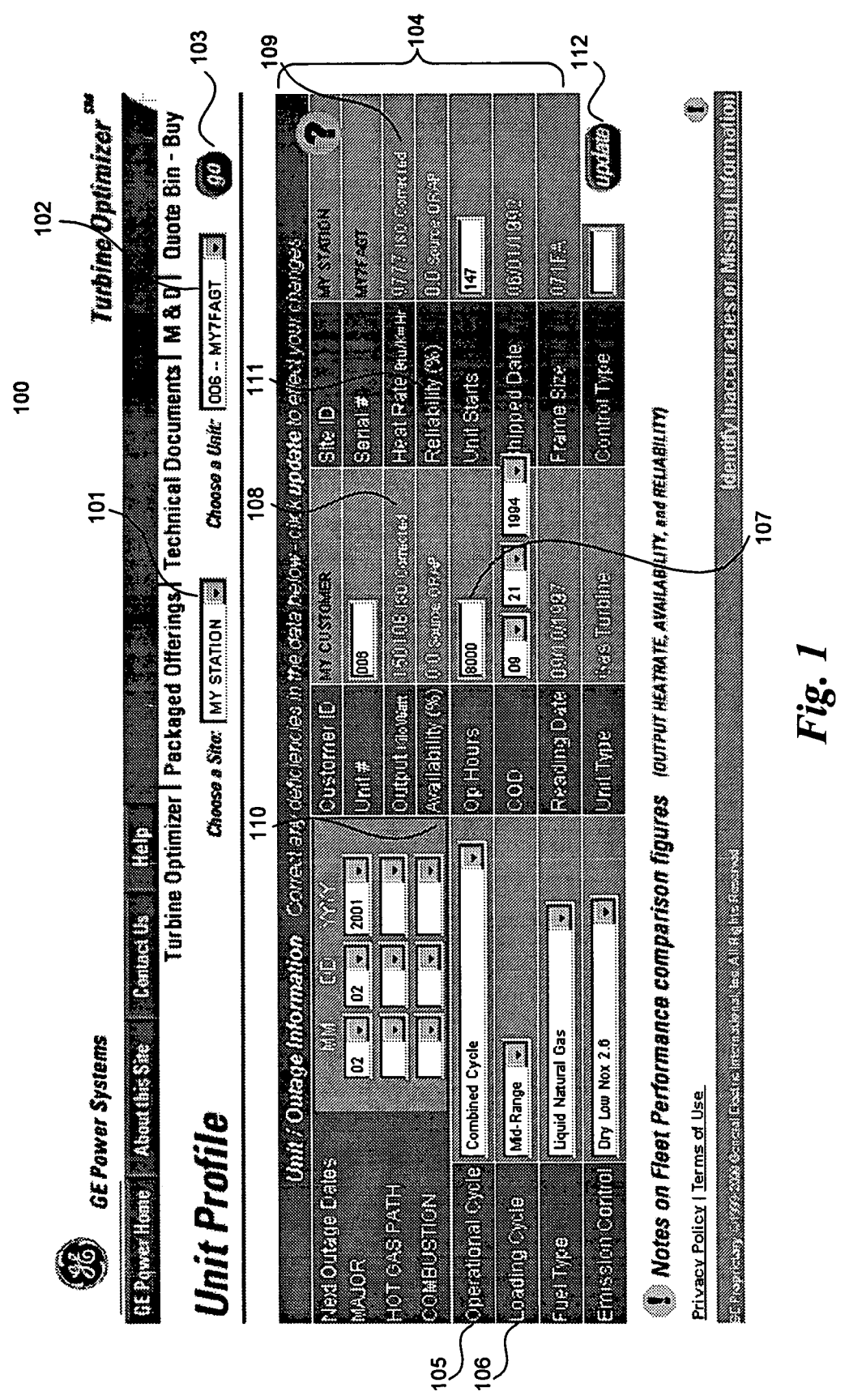
Figure 2:
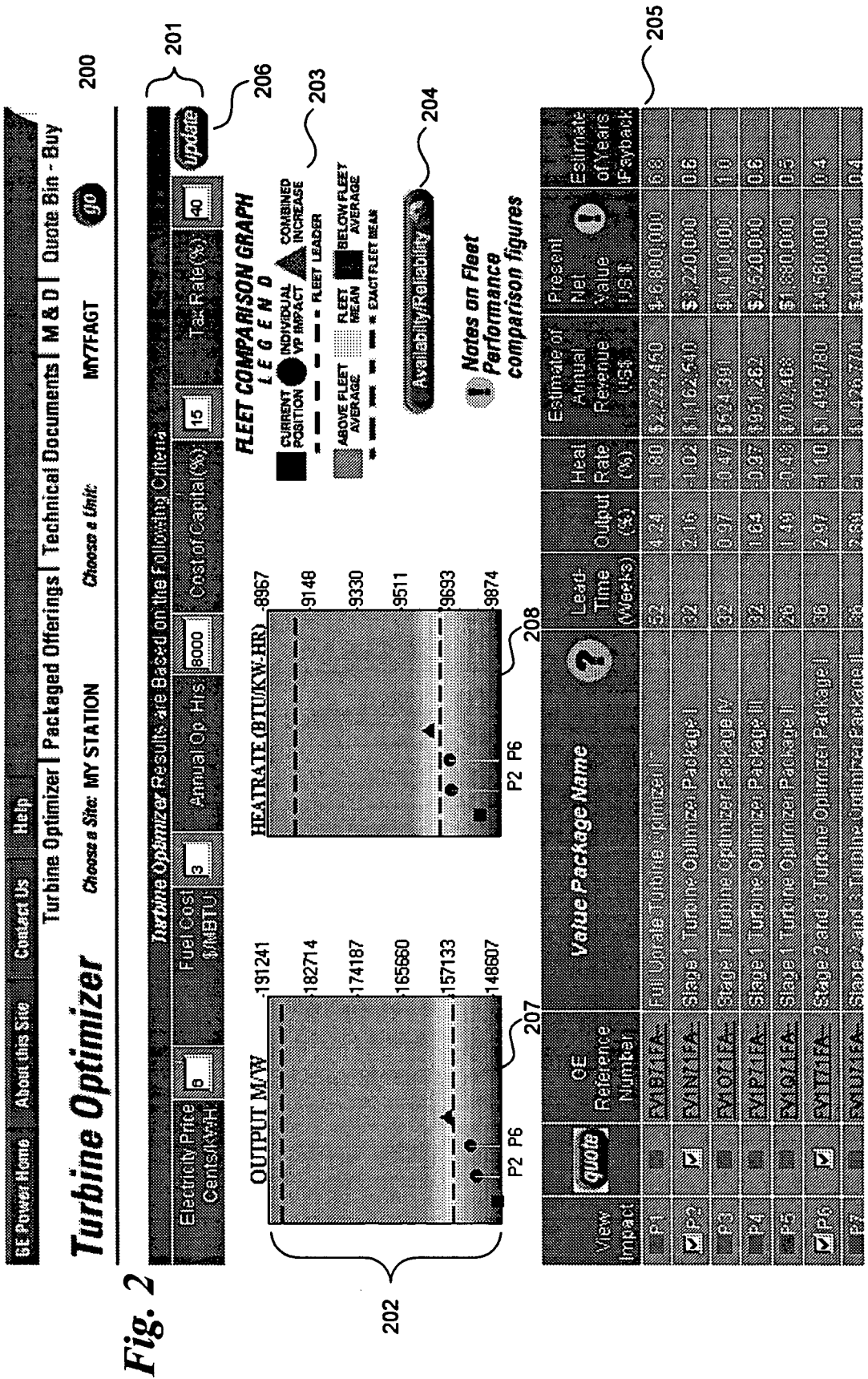
FIG. 2 illustrates a display of the turbine optimizer display page in one embodiment.

FIG. 1 illustrates the display of a unit profile display page in one embodiment. The unit profile display page 100 contains configuration information and performance characteristics for a selected turbine unit. The user may have logged on to the turbine optimizer using a previous display page. The currently identified turbine is indicated by the site field 101 and unit field 102. The site field is a drop-down list indicating the sites that the user is authorized to access. The unit field is a drop-down list indicating the turbines at the selected site. The user can identify a different turbine and then select the go-button 103 to display unit profile information for a different turbine. The unit profile information area 104 includes various input configuration fields, such as operational cycle 105, loading cycle 106, and annual hours of operation 107. The unit profile information area also includes performance characteristics, such as output 108, heat rate 109, availability 110, and reliability 111. The user can correct the data in the various input configuration fields. The user can then select the update button 112 to update the configuration data and request display of the turbine optimizer display page.

FIG. 2 illustrates a display of the turbine optimizer display page in one embodiment. The turbine optimizer display page 200 includes a financial criteria area 201, a graph performance characteristics area 202, a legend 203, an availability/reliability button 204, and future performance characteristics grid 205. The turbine optimizer may initially generate this display page based on default financial criteria. The user may change the values in the financial criteria area and select the update button 206 to update the financial information in the future performance characteristics grid based on the changed values. The graphs 202 provide a graphical representation of the performance characteristics. Graph 207 illustrates the current output as indicated by the square, the future outputs for modifications P2 and P6 (referred to as "value packages") as indicated by the circle, and future output for the combination of modifications P2 and P6 as indicated by the triangle. The lower dash line indicates the average value of the performance characteristics for similar turbines, and the upper dash line indicates the highest value of the performance characteristic for similar turbines. The turbine optimizer can maintain a database of current performance characteristics for similar turbines and determine the average and highest values from that database. In one embodiment, the graph is displayed with a background coloring that is indicative of the desirability of the value of the performance characteristics. For example, the portion of the graph corresponding to a less desirable value (e.g., the lower portion) may have its background in a shade of red and the portion corresponding to a more desirable value (e.g., the upper portion) may have its background in a shade of green. In between the red and the green portions may be a shade of the yellow that surrounds the average value of the performance characteristics. The shades of red and green may be darkest toward the lowest and highest values and gradually decrease in darkness toward the average value. The legend provides an explanation of the graphs. The availability/reliability button is used to display a similar display page that provides similar information for the availability and reliability performance characteristics. The future performance characteristics grid displays performance characteristics and financial characteristics associated with various possible modifications. The user can select a check box to view the impact of a modification and to request a quote for the modification.

FIG. 3 is a block diagram illustrating an uprate performance impact matrix in one embodiment. Each turbine may have different performance characteristics resulting from the same modifications. For example, one turbine may have its output increased by 1% by a certain modification, and another turbine may have its output decrease by 2% by that same modification. The turbine optimizer uses this matrix to estimate the future performance characteristics for various modifications. The matrix 300 includes a customer name column 301, serial number column 302, current rating column 303, and result columns 304. Each customer is represented by two rows. The first row corresponds to turbine output information, and the second row corresponds to the heat rate information. The turbine optimizer uses the uprate performance impact matrix to identify the effect of a certain uprate on the turbine. For example, if the user for the Acme customer selects the uprate "Stg1," then the turbine optimizer increases the current output by 0.64% to estimate the future output and decreases the current heat by 0.51% to estimate the future heat rate.

Figure 4:
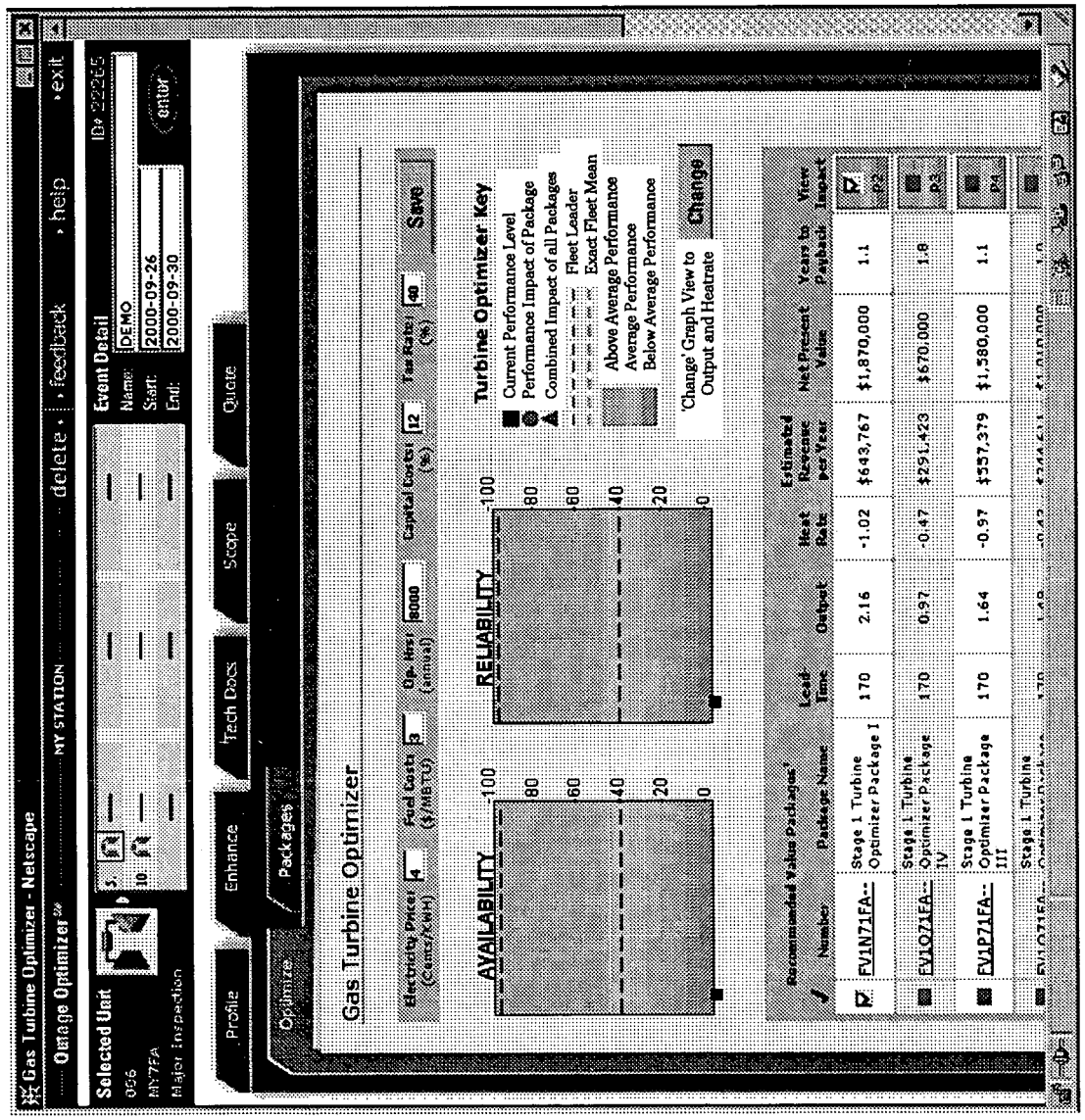
FIG. 4 illustrates the display of the turbine optimizer display page for reliability and availability performance characteristics.

FIG. 4 illustrates the display of the turbine optimizer display page for reliability and availability performance characteristics.

In one embodiment, the turbine optimizer estimates the performance characteristics of the turbine based on monitoring and diagnostic instrumentation measurements taken from the turbine. The turbine optimizer may use a thermodynamic balance simulator to estimate of the performance characteristics based on the instrumentation measurements. When a manufacturer designs a new turbine, the manufacturer typically creates a thermodynamic model to estimate the performance of the turbine under various operating conditions. This simulator may be suitable for estimating the current performance characteristics based on various readings from the turbine. A suitable simulator includes the "Gate/Cycle" software system by General Electric. Table 1 illustrates some inputs of a simulator in one embodiment.

TABLE 1

| Input Type | Input |
| --- | --- |
| Ambient Conditions | Ambient Temperature (F.) |
| | Firing Temperature (F.) |
| | Compressor Speed Ratio |
| | Ambient Pressure (psia) |
| | Inlet Pressure Drop (inch H2O) |
| | Exhaust Pressure Drop (inch H2O) |
| | IGV Angle (deg) |
| Option Codes | Atomizing Air |
| | Fuel Type |
| | Number of Custom Bleeds |
| | Print Option |
| | Use Control Curve constants |
| | NOX Option |
| | Combustion System |
| Fuel Description | Number of Constituents (maximum of 24) |
| | Fuel temperature (F.) |
| | Fuel Code |
| | Volume Fraction (Required) |
| Bleed | Customer Overhead Bleed |
| | (LBMair/LBMComp In. Flow) |
| Humidity | Relative Humidity |
| Water or Steam Injection | H2O Temperature (F.) |
| Control Curve Constants | Control Curve Slope |
| | Y-intercept in degrees F. |
| | Exhaust Temperature Isotherm (Limit) F. |
| Exhaust | Minimum IGV limit |
| Bleed Heat | Bleed heat cutoff IGV |

The outputs of the simulator may include output, heat rate, fuel flow, and so on.

It may be possible that the collected instrumentation readings may not be sufficient for the simulator to generate accurate performance characteristics. To overcome this difficulty, the turbine optimizer in one embodiment may iteratively execute the simulator attempting to converge on an estimated fuel flow for a fixed combustor efficiency since the accuracy of combuster efficiency is more certain than the accuracy of fuel flow. In one embodiment, the turbine optimizer uses the Secant method for converging on fuel flow. The to Secant method is described in "Numerical Recipes in C: The Art of Scientific Computing," by Press, Teukolsky, Vetterling, and Flannery and published by Cambridge University Press in 1992 and which is hereby incorporated by reference.

Figure 5:
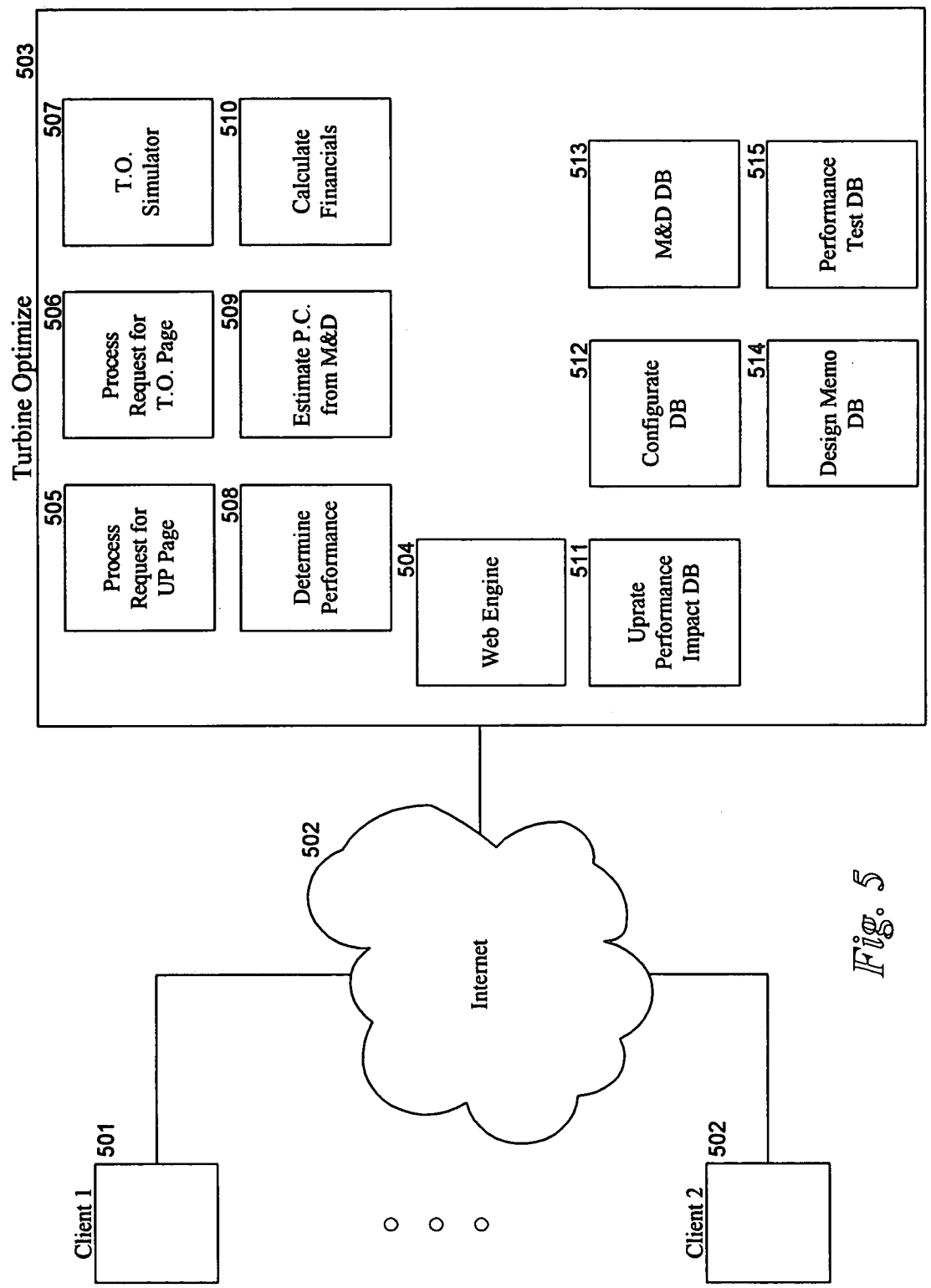
FIG. 5 is a block diagram illustrating the runs used to implement the turbine optimizer in one embodiment.

FIG. 5 is a block diagram illustrating an architecture used to implement the turbine optimizer in one embodiment. The client computers 501 and the turbine optimizer computer 503 are interconnected via the Internet 502. The computers may include a central processing unit, memory, input devices (e.g., keyboard and pointing device), output devices (e.g., display devices), and storage devices (e.g., disk drives). The memory and storage devices are computer-readable media that may contain computer instructions that implement the turbine optimizer. In addition, the data structures (e.g., databases) and message structures (e.g., http-request messages) may be stored or transmitted via computer-readable media such as a signal via a communications link. The client computers may use browsers to access web pages of the server via the Internet. One skilled in the art will appreciate that the concept of the turbine optimizer can be used in many different environments. For example, various communication channels other than the Internet may be used, such as a local area network, a wide area network, or a point-to-point dial-up connection. The computer systems may comprise any combination of hardware and software that can support web servers and browsers. In particular, a web server may actually include multiple computers. The client computers may comprise any combination of hardware or software that interacts with server systems.

The turbine optimizer computer includes a web engine 504, a process request for unit profile page component 505, a process request for turbine optimizer page component 506, a turbine optimizer simulator 507, a determine performance component 509, an estimate performance characteristics component 509, and a calculate financials component 510. The turbine optimizer computer also includes an uprate performance impact database 511, a configuration database 512, a monitoring and diagnostic database 513, a design memorandum database 514, and a performance test database 515. The web engine receives http-request messages, provides the request to the appropriate components, and sends the http-response messages generated by the components. The process request for unit profile page component is invoked when the web engine receives a request for the unit profile page. That component generates and send the unit profile page. The process request for turbine optimizer page component is invoked when the web engine receives a request for the turbine optimizer page. That component generates and sends the turbine optimizer page. The determine performance component is used to determine performance characteristics for the turbine. The determination may be based on precision tests, on a simulator using instrumentation reading, or an anticipated performance degradation over the life of a turbine. The estimate performance characteristics component generates the performance characteristics based on monitoring and diagnostic instrumentation measurements. That component iteratively invokes the turbine optimizer simulator. The calculate financials component calculates the financial impact of modifications to a turbine. The uprate performance impact database contains the uprate performance impact matrix. That matrix indicates the effect of the modifications of a turbine on the performance characteristics. The configuration database contains the configuration information for each turbine installed at a customer site. The configuration information may include such information has the currently installed performance packages, the turbine model, the annual operation hours, the operation cycle, loading cycle, fuel type, emission control, and so on. The monitoring and diagnostic database contains the instrumentation readings collected from the turbines. The design memorandum database contains information describing the initial performance characteristics of a turbine and the degradation of performance characteristics as a result of hours of operation. The performance test database contains the values of the performance characteristics collected by performing precision test at the turbine.

Figure 6:
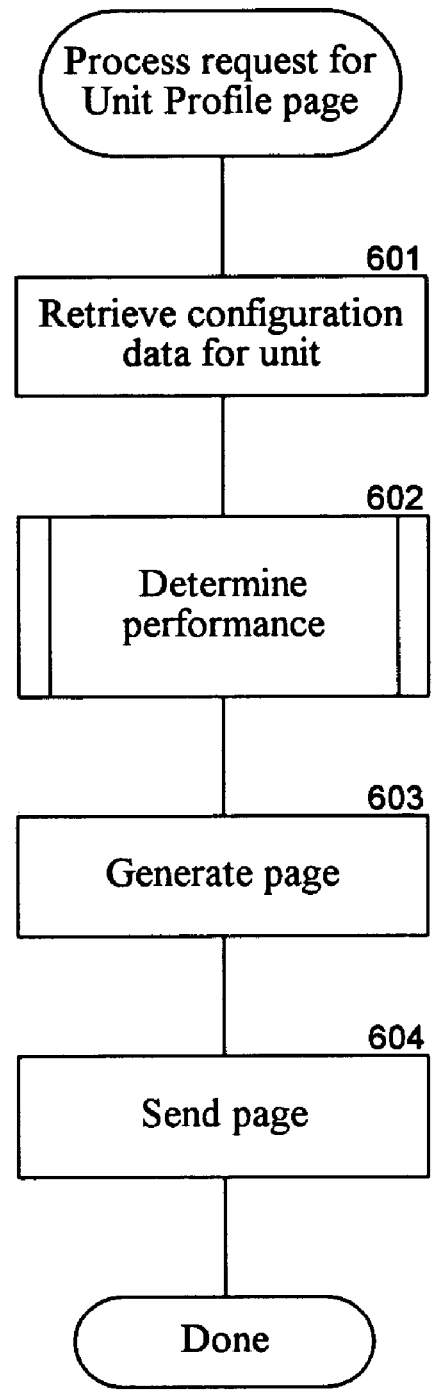
FIG. 6 is a flow diagrams of the process request for unit profile page component.

FIGS. 6-13 are flow diagrams illustrating the processing of the components of the turbine optimizer in one embodiment. FIG. 6 is a flow diagrams of the process request for unit profile page component. This component is passed an indication of the turbine unit to be analyzed. In block 601, the component retrieves the configuration data for the unit to be analyzed from the configuration database. In block 602, the component invokes the determine performance component to determine the performance characteristics for the unit. That component returns the performance characteristics. In block 603, the component generates the unit profile web page based on the returned performance characteristics. In block 604, the component sends the web page to the user's computer and completes.

Figure 7:
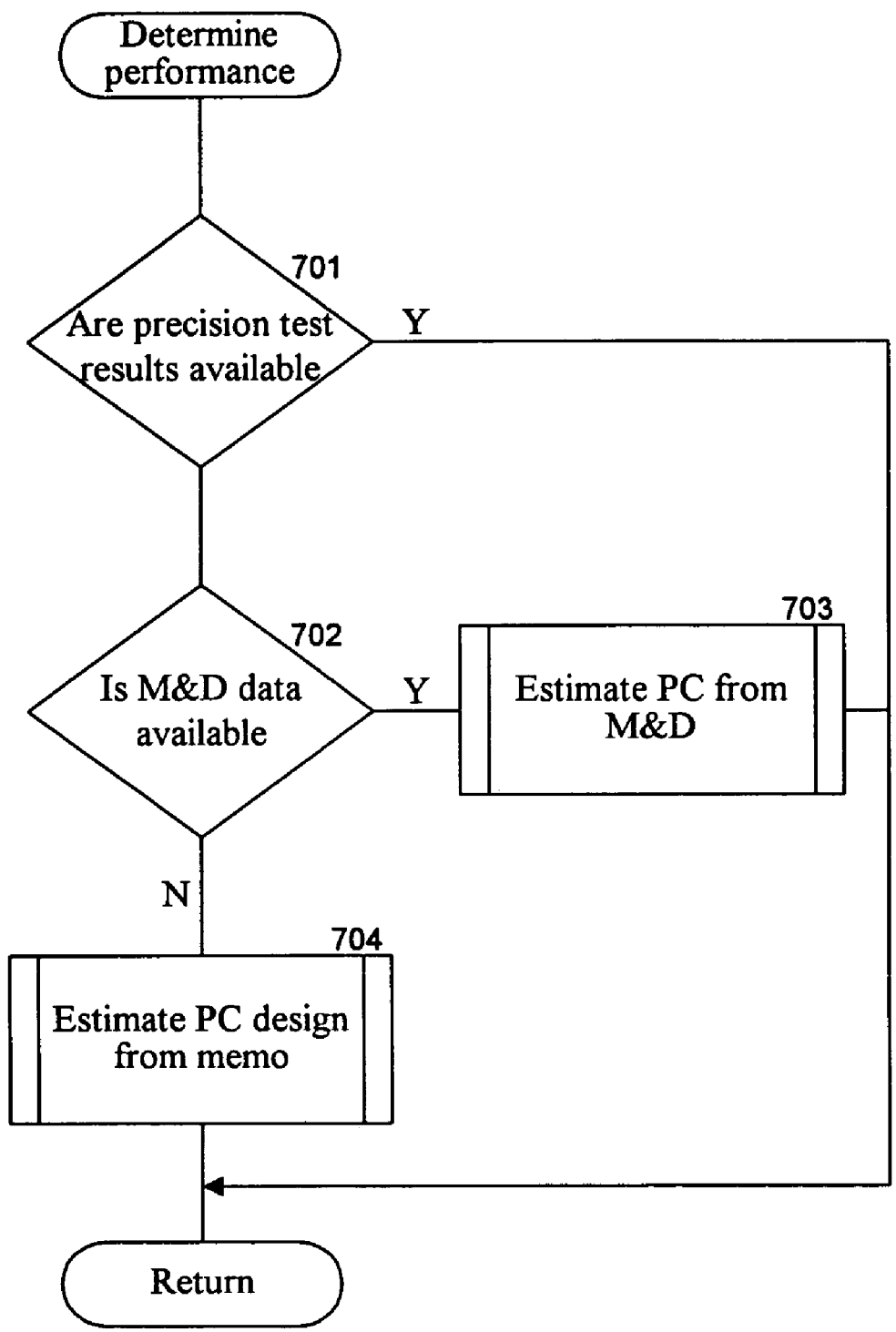
FIG. 7 is a flow diagram of the calculate performance component in one embodiment.

FIG. 7 is a flow diagram of the determine performance component in one embodiment. This component identifies and returns the values of the performance characteristics. The component may return the results of a precision test if available. If not available, the component estimates the value of the characteristics based on the monitoring and diagnostic information if available. If not available, then the component estimates of the use of the performance characteristics based on the initial value of the performance characteristics when the turbine was new adjusted based on the degradation resulting from hours of operation. In decision block 701, if precision test results are available, then the component retrieves and returns those results as the values of the performance characteristics, else the component continues at block 702. In decision block 702, if the monitoring and diagnostic information is available, then the component continues at block 703, else the component continues at block 704. In block 703, the component invokes the estimate performance characteristics from monitoring and diagnostic information component and then returns. In block 704, the component invokes the estimate performance characteristics from design memo randum component and then returns.

Figure 8:
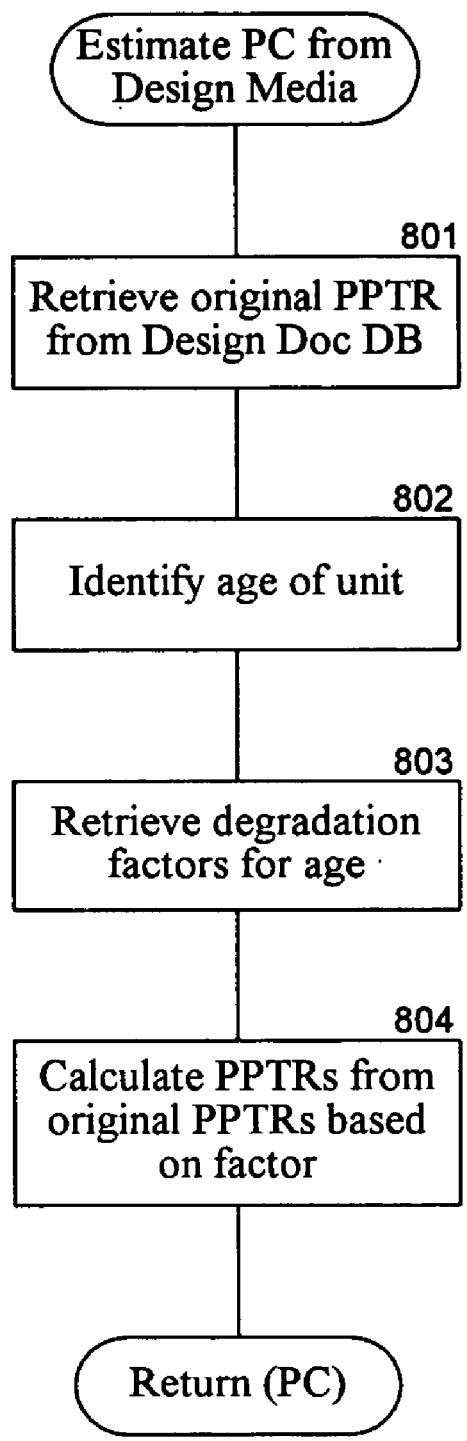
FIG. 8 is a flow diagram illustrating the processing of the estimate performance characteristics from design memo component in one embodiment.

FIG. 8 is a flow diagram illustrating the processing of the estimate performance characteristics from design memo randum component in one embodiment. In block 801, the component retrieves the original values of the performance characteristics from the design documentation database. In block 802, the component identifies the number of hours that the turbine has been operational. In block 803, the component retrieves the degradation factors for the performance characteristics based on the number of operational hours. In block 804, the component calculates the values for the performance characteristics from the original performance characteristics adjusted by the factor. The component then returns the performance characteristics.

Figure 9:
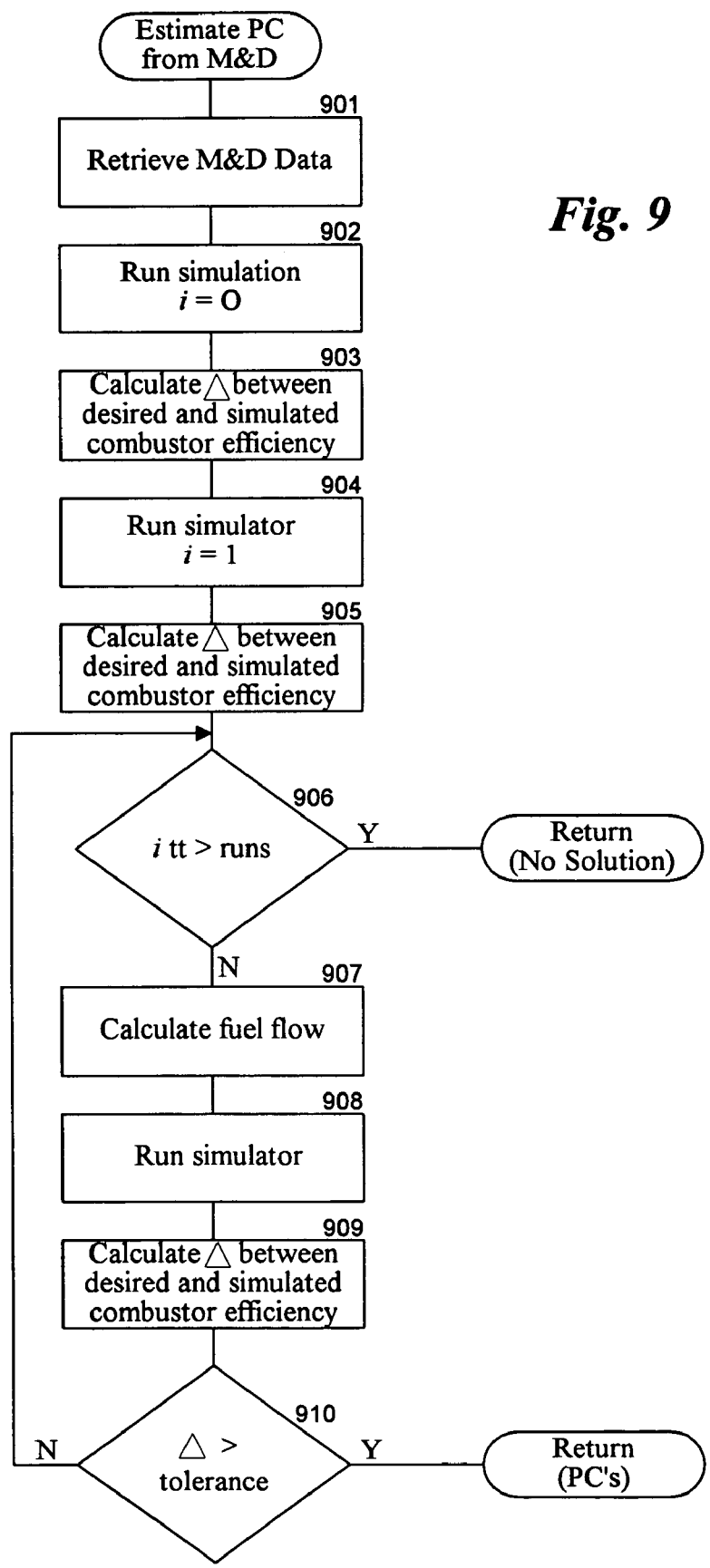
FIG. 9 is a flow diagram illustrating the processing of the estimate performance characteristics from monitoring and diagnostic information component in one embodiment.

FIG. 9 is a flow diagram illustrating the processing of the estimate performance characteristics from monitoring and diagnostic information component in one embodiment. This component estimates the performance characteristics by iteratively executing a simulator by varying the fuel flow until a fixed combustor efficiency is obtained. In block 901, the component retrieves the monitoring and diagnostic information for the turbine from the monitoring and diagnostic database. In blocks 902-905, the component calculates the combustor efficiency for two runs of the simulator. These combustor efficiencies serve as the starting point for calculating the fuel flow for the next run of the simulator. In block 902, the component runs the simulator with a fuel flow set to the measured fuel flow. In block 902, the component calculates the difference between the desired and simulated combustor efficiency for that simulation. In block 904, the component again runs the simulator with the fuel flow set to the measured fuel flow plus one percent. One skilled in the art will appreciate that different starting fuel flows could be used. In block 905, the component calculates the difference between the desired and simulated combustor efficiency. In blocks 906-910, the component loops running the simulator at different fuel flows until the simulated combuster efficiency is within a certain tolerance of the desired combustor efficiency. In decision block 906, the component increments a run counter and determines whether the run counter is greater than a maximum number of runs. If so, the component returns indication that no solution has been found, else the component continues at block 907. In block 907, the component calculates a new fuel flow. In block 908, the component runs the simulator. In block 908, the component calculates the difference between the desired and simulated combustor efficiency. In decision block 910, if the calculated difference is within a certain tolerance, then the component returns the performance characteristics, else the component loops to block 906 to perform the next simulation run. Table 2 contains pseudo-code for iteratively running the simulation. The variable ETAB represents the desired combustor efficiency, p represents fuel flow, q represents error between desired and calculated combustion efficiency, y represents fuel flow calculated by the simulator, and N represents the number of iterations.

TABLE 2

```
for i = 0,N
    run simulation with p_i
    if i ≥ 3
```
$$p_i = p_{i-1} - q_{i-1} * \left(\frac{p_{i-1} - p_{i-2}}{q_{i-1} - q_{i-2}}\right)$$
```
    endif
```
$$q_i = \frac{y_i + ETAB}{100 * .5(y_i + ETAB)}$$
```
    if |q_i| ≤ Tolerance, p_i is solution
endfor
```

Figure 10:
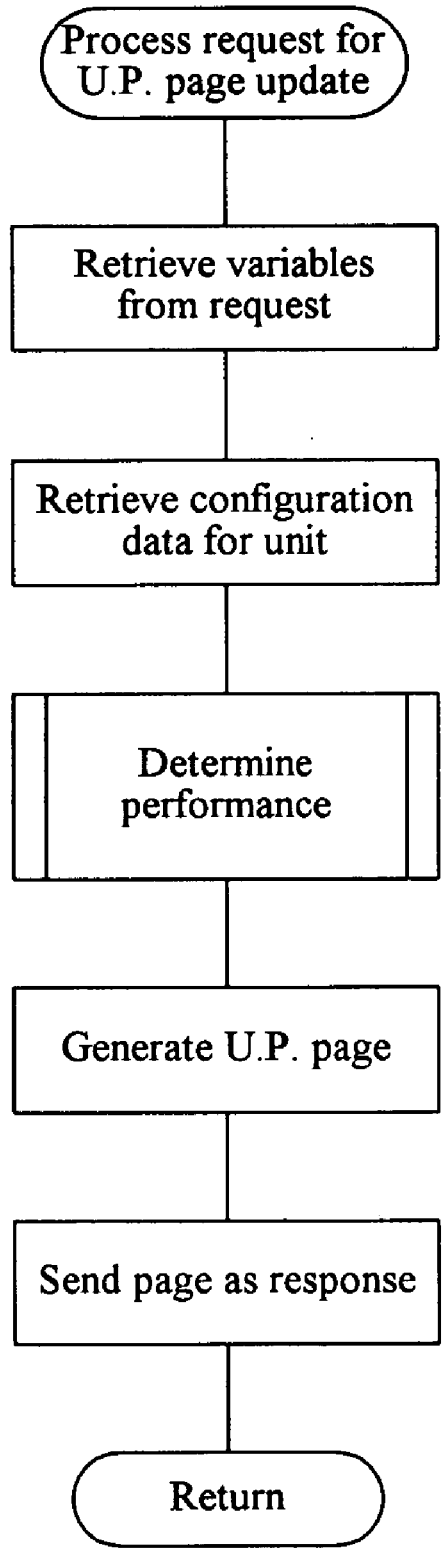
FIG. 10 is a flow diagram illustrating the processing of the process request for unit profile page update in one embodiment.

FIG. 10 is a flow diagram illustrating the process request for unit profile page update in one embodiment. This component functions similarly to the process request unit profile page component except that this component uses the updated configuration information provided by the user.

Figure 11:
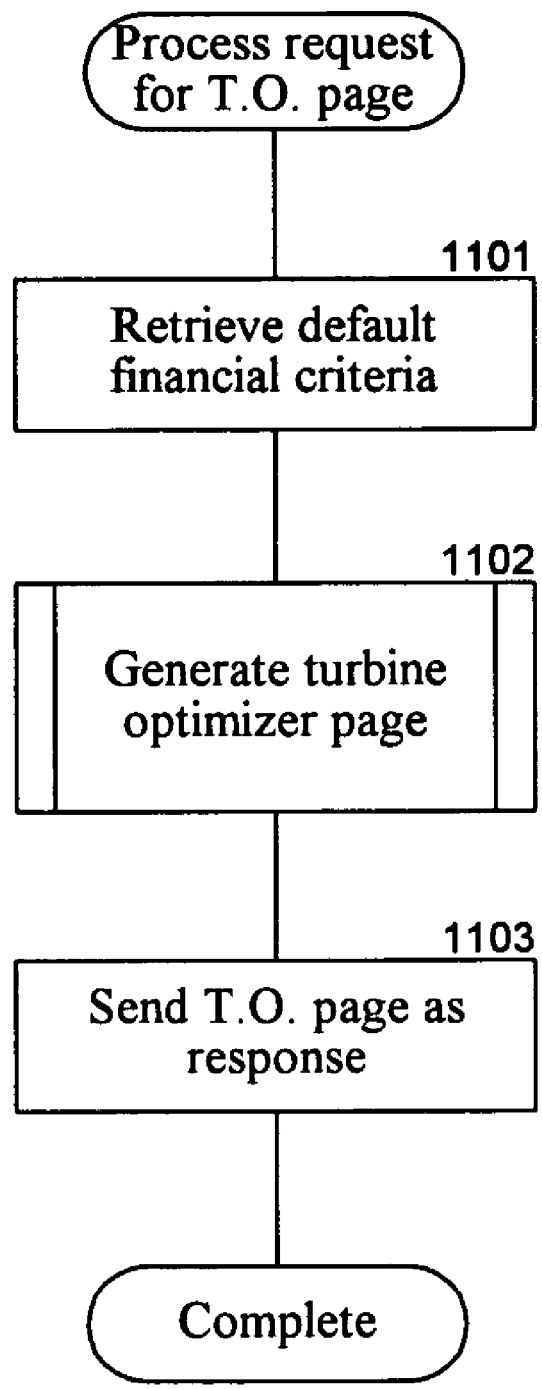
FIG. 11 is a flow diagram of the processing of the process request for Karen optimizer page component in one embodiment.

FIG. 11 is a flow diagram illustrating the process request for turbine optimizer page component in one embodiment. In block 1101, the component retrieves the default financial criteria. In block 1102, the component invokes the generate turbine optimizer page routine. In block 1103, the component sends the turbine optimizer page to the user as a response and completes.

Figure 12:
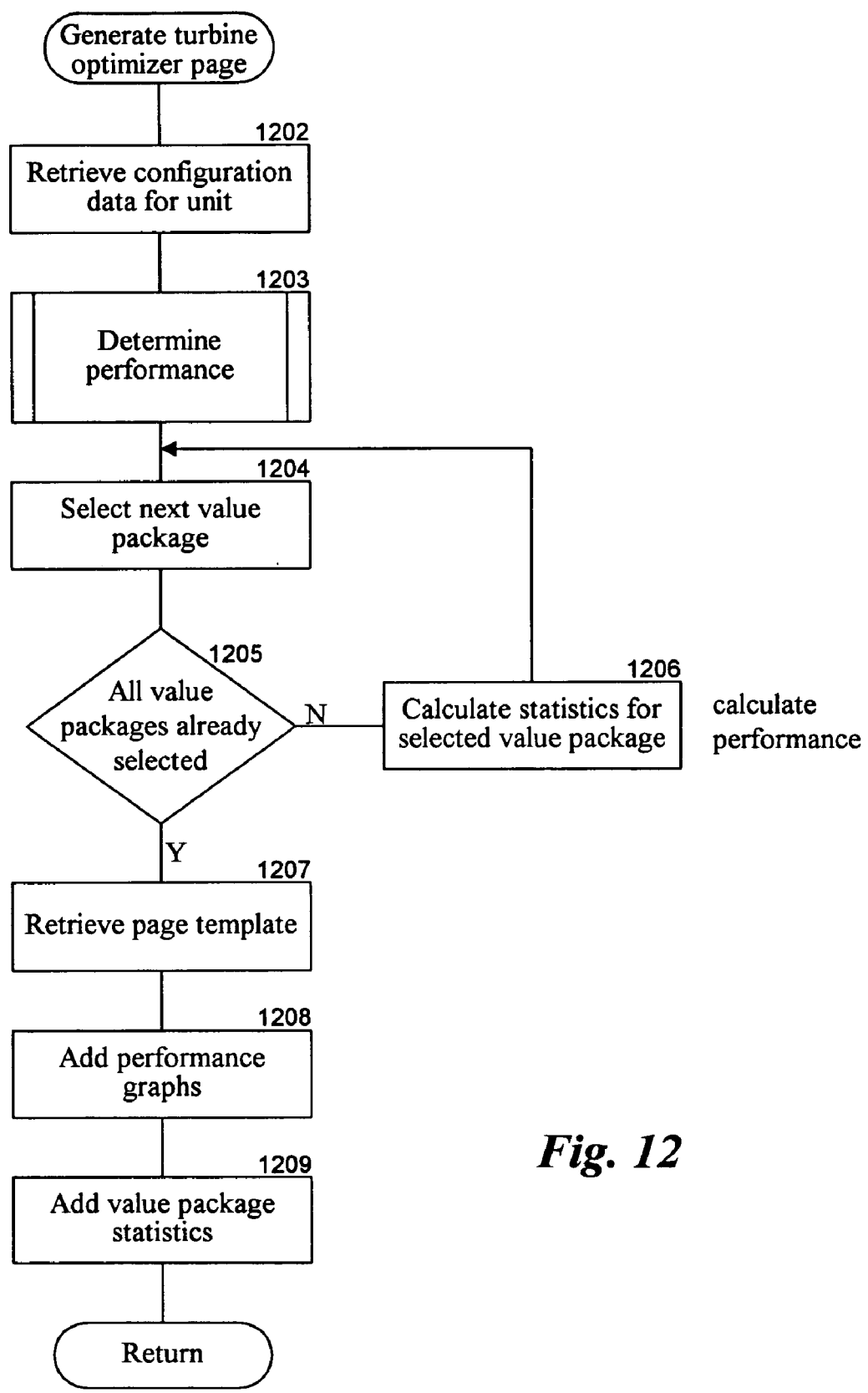
FIG. 12 is a flow diagram illustrating processing of the generate turbine optimizer page routine and one embodiment.

FIG. 12 is a flow diagram illustrating the generate turbine optimizer page routine in one embodiment. In block 1202, the routine retrieves the configuration data for the unit. In block 1203, the routine invokes the determine performance component. In blocks 1204-1206, the routine loops calculating the statistics for each selected value package. A value package corresponds to a modification to the turbine. In block 1204, the routine selects the next value package that is appropriate for the turbine. In decision block 1205, if all the value packages have already been selected, then the routine continues at block 1207, else the routine continues at block 1206. In block 1206, the routine calculates the statistics for the selected value package. The statistics may be calculated by invoking the determine performance component and invoking the calculate financial data component. The routine then loops to block 1204 to select the next value package. In block 1207, the routine retrieves the template for the web page. In block 1208, the routine adds the performance graphs to the web page. In block 1209, the routine adds the value package statistics to the web page and then returns.

Figure 13:
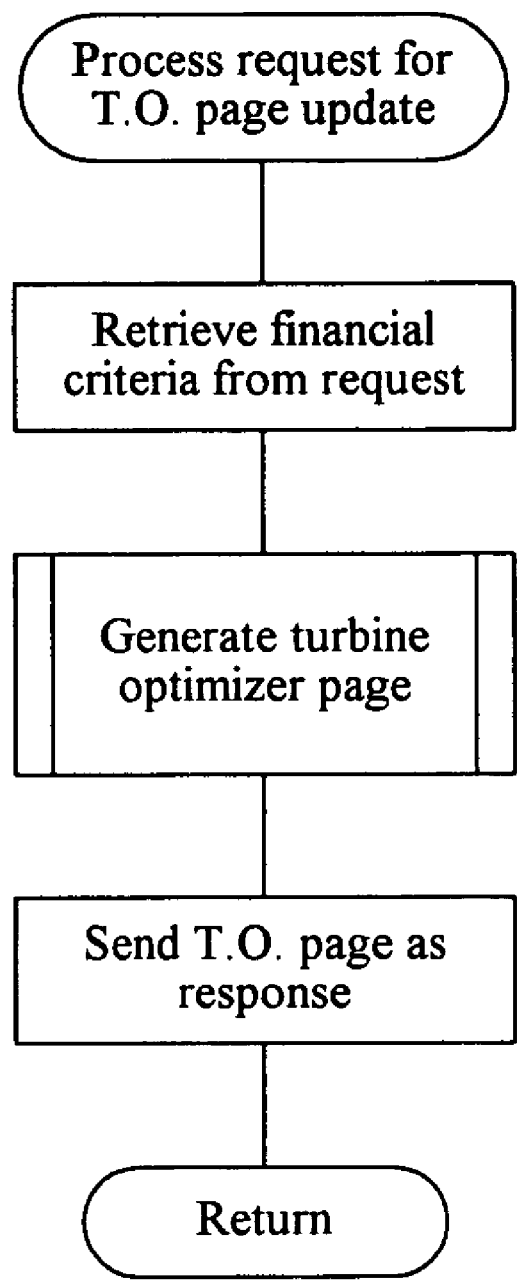
FIG. 13 is a flow diagram illustrating processing of a process request for turbine optimizer page update component in one embodiment.

FIG. 13 is a flow diagram illustrating the process request for turbine optimizer page update component in one embodiment. This component functions in a similar manner to the process request for turbine optimizer page component except that the financial criteria is retrieved from the request rather than using default financial criteria.

Tables 3A-3C illustrate the algorithm used by the calculate financial data component.

TABLE 3A

Input Values

Operating hours per year (hours)
Expected Fuel cost ($/MMBTU)
Expected Electricity Sell Price ($/kW-hr)
Current Output (kW)
Current Heat Rate (BTU/kW-Hr)
Output Increase (%)
Heat Rate Decrease (%)
Package Price ($)
Package Price Delta ($)
Cost of Capital or Discount Rate (%)
Tax Rate (%)

TABLE 3B

Calculated Values

| Value | Calculation |
|---|---|
| Additional Kilowatts | (Current output) * (Output Increase) |
| Additional Revenue | (Additional Kilowatts) * (Operating hours per year) * (Expected Electricity Sell Price) |
| Current Fuel Usage | ((Current Output) * (Current Heat Rate) * (Expected Fuel cost) * (Operating hours per year))/(1,000,000) |
| New Fuel Usage | ([Current Output) * (1 + Output Increase)] * [(Current Heat Rate) * (1 + Heat Rate Decrease)] * (Expected Fuel cost) * (Operating hours per year))/(1,000,000) |
| Additional Fuel Usage | Current Fuel Usage − New Fuel Usage |
| Annual Customer Benefit | Additional Revenue + Additional Fuel Usage |

TABLE 3C

Algorithms

```
Depreciation_Percentage [1..7] = 20, 32, 19, 11.52, 11.52, 5.76    / * Modified Accelerate
                                                                   / * Cost Recovery System
    For i = 1,7
        Depreciation[i] = Depreciation_Percentage[i] * Package Price
        If Depreciation[i] < Annual Customer Benefit
            Tax[i] = Tax Rate * (Annual Customer Benefit − Depreciation[i])
        Else
            Tax[i] = 0
        Revenue[i] = Annual Customer Benefit − Tax
    PresentValue[i] = Revenue[i] / (1 + Cost of Capital) ^ i
    Present Value = Present Value + Present Value[i]
endfor
NPV = Present Value − Package Price Delta
```

The invention claimed is:

1. A method in a computer system for determining performance of an installed power generating turbine, the method comprising:
   receiving from an operator installed turbine manufacturer identification information relating to the installed turbine to be analyzed;
   retrieving configuration information for the identified installed turbine;
   determining current performance characteristics of the installed turbine based on the retrieved configuration information;
   sending to the operator a display page for displaying the determined current performance characteristics;
   receiving from the operator an indication of a modification to the configuration of the identified installed turbine;
   determining future performance characteristics of the identified installed turbine based on the indicated modification to its configuration; and
   sending to the operator a display page for displaying the determined future performance characteristics.

2. The method of claim 1 wherein the determining of the current performance characteristics includes simulating the current performance characteristics based on plural readings collected from the identified installed turbine.

3. The method of claim 2 wherein the simulating of the current performance characteristics includes estimating fuel flow by repeatedly simulating the current performance characteristics with a varying fuel flow until a desired combustor efficiency is achieved.

4. The method of claim 1 wherein the determining of the current performance characteristics includes adjusting initial performance characteristics based on length of time the identified turbine has been in operation.

5. The method of claim 1 wherein the determining of the current performance characteristics includes measuring the performance characteristics of the installed turbine.

6. The method of claim 1 wherein the display page includes an indication of average performance characteristics for other turbines.

7. The method of claim 1 wherein the display page includes a graph illustrating performance characteristics.

8. The method of claim 7 wherein the graph includes a background with colors that transition from a shade of red to a shade of yellow to a shade of green.

9. The method of claim 1 including receiving financial information relating to operation of the identified installed turbine and estimating revenue generated from the identified installed turbine with the indicated modification.

10. A method in a computer system for determining performance of an installed power generating turbine, the turbine having a configuration, the method comprising:
    receiving from an operator installed turbine manufacturer identification information relating to the installed turbine to be analyzed;
    simulating a current performance characteristic based on a plurality of readings collected from the installed identified turbine;
    receiving from an operator of the installed turbine an indication of a modification to the configuration of the identified installed turbine;
    determining a future performance characteristic of the identified installed turbine based on the indicated modifications to its configuration; and
    sending to the operator a display page for displaying the determined future performance characteristic.

11. The method of claim 10 wherein the simulating of the current performance characteristic includes estimating fuel flow by repeatedly simulating the current performance characteristic with a varying fuel flow until a desired combustor efficiency is achieved.

12. The method of claim 10 wherein the display page includes an indication of an average for the current performance characteristic for other turbines.

13. The method of claim 10 wherein the display page includes a graph illustrating performance characteristics.

14. The method of claim 13 wherein the graph includes a background with colors that transition from a shade of red to a shade of yellow to a shade of green.

15. The method of claim 10 wherein the display page is a web page.

16. The method of claim 10 wherein the display page is sent via Internet.

17. The method of claim 10 including receiving financial information relating to operation of the identified installed turbine and estimating revenue generated from the identified installed turbine with the indicated modification.

18. A method in a computer system for displaying a performance characteristic of an installed power generating turbine, the method comprising:
    sending an identification of the installed turbine to a manufacturer of the turbine; and
    receiving a display page indicating a performance characteristic of the identified installed turbine relative to the said performance characteristic for other power generating turbines.

19. The method of claim 18 including:
    sending an indication of a modification to the identified installed turbine; and
    receiving a display page indicating the performance characteristic of the identified installed turbine with the indicated modifications.

20. The method of claim 18 wherein the display page includes financial information relating to possible modifications to the identified installed turbine.

21. The method of claim 18 wherein the performance characteristic of the identified installed turbine is displayed as a graph.

22. The method of claim 21 wherein the graph indicates the performance characteristic for other turbines.

23. The method of claim 22 wherein the graph includes an indication of an average performance characteristic for other turbines.

24. The method of claim 21 wherein the graph includes a background with colors that transition from a shade of red to a shade of yellow to a shade of green.

25. A computer-readable medium containing instructions for controlling a computer system to determine a performance characteristic of an installed turbine, the installed power generating turbine having a configuration, by a method comprising:
    receiving from an operator installed turbine manufacturer identification information relating to the installed turbine to be analyzed;

simulating a current performance characteristic based on a plurality of readings collected from an identified installed power generating turbine;

receiving an indication of a modification to the configuration of the identified installed turbine; and determining a future performance characteristic of the identified installed turbine based on the indicated modifications to the configuration.

26. The computer-readable medium of claim 25 wherein the simulating of the current performance characteristic includes estimating fuel flow by repeatedly simulating the current performance characteristic by varying fuel flow until a desired combustor efficiency is achieved.

27. The computer-readable medium of claim 25 including receiving financial information relating to operation of the identified installed turbine and estimating revenue generated from the identified installed turbine with the indicated modification.

28. The computer-readable medium of claim 25 including sending a display page for displaying the determined future performance characteristic.

29. The computer-readable medium of claim 28 wherein the display page includes an indication of an average for the performance characteristic for other turbines.

30. The computer-readable medium of claim 28 wherein the display pages includes a graph illustrating the performance characteristics.

31. The computer-readable medium of claim 30 wherein the graph includes a background with colors that transition from a shade of red to a shade of yellow to a shade of green.

32. The computer read-able medium of claim 28 wherein the display page is a web page.

33. The computer-readable medium of claim 28 wherein the display page is sent via Internet.

34. A computer system for determining a performance characteristic of an installed power generating turbine, the turbine having a configuration, comprising:

means for receiving manufacturer identification information and an indication of a modification to the configuration of the identified installed turbine; and means for determining a future performance characteristic of the identified installed turbine based on the indicated modifications to its configuration.

35. The computer system of claim 34 including:

means for simulating a current performance characteristic based on various readings collected from the identified installed turbine.

36. The computer system of claim 35 wherein the means for simulating the current performance characteristic includes means for estimating fuel flow by repeatedly simulating the current performance characteristic by varying fuel flow until a desired combustor efficiency is achieved.

37. The computer system of claim 34 including means for receiving financial information relating to operation of the identified installed turbine and means for estimating revenue generated from the identified installed turbine with the indicated modification.

* * * * *